US011639859B2

(12) United States Patent
McGee et al.

(10) Patent No.: US 11,639,859 B2
(45) Date of Patent: May 2, 2023

(54) METHOD FOR DETERMINING ROTATIONAL POSITION OF A ROTATING CAMSHAFT ON A RECIPROCATING ENGINE USING A TARGET WITH A PATTERN OF TEETH AND A COLLECTION OF DETECTION ALGORITHMS

(71) Applicant: Deere & Company, Moline, IL (US)

(72) Inventors: Brian D. McGee, Cedar Falls, IA (US); Kristin A. Molstad, Brookings, SD (US); Gary J. Treichel, Cedar Falls, IA (US); Rodney W. Kvalvog, Fargo, ND (US); Stephen B. Lukas, Cedar Falls, IA (US); Thomas M. Johnson, Cedar Falls, IA (US); Jeffrey L. England, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 372 days.

(21) Appl. No.: 17/011,247

(22) Filed: Sep. 3, 2020

(65) Prior Publication Data
US 2021/0364324 A1 Nov. 25, 2021

Related U.S. Application Data

(60) Provisional application No. 63/028,853, filed on May 22, 2020.

(51) Int. Cl.
*G01D 5/14* (2006.01)
*F02D 41/00* (2006.01)
(Continued)

(52) U.S. Cl.
CPC .......... *G01D 5/145* (2013.01); *F02D 41/009* (2013.01); *F02D 41/30* (2013.01); *G01B 7/30* (2013.01); *G01D 5/2291* (2013.01)

(58) Field of Classification Search
CPC .... G01D 5/145; G01D 5/2291; G01D 5/2457; F02D 41/009; F02D 41/30; F02D 2041/0092; G01B 7/30
See application file for complete search history.

(56) References Cited

U.S. PATENT DOCUMENTS

4,145,608 A * 3/1979 Shirasaki ................. G01D 5/36
250/237 G
4,644,917 A * 2/1987 Yakuwa ................ F02P 7/0775
123/406.18
(Continued)

*Primary Examiner* — David Hamaoui
(74) *Attorney, Agent, or Firm* — Tucker Ellis LLP; Heather M. Barnes; Michael G. Craig (57) ABSTRACT

Identifying position of a first rotating shaft may comprise a first position detection system and a second position detection system. A controller may be coupled to a first sensor and a second sensor and may identify the position of the first shaft using the identified shaft position from either the first detection system or the second detection system, whichever is identified faster. The first shaft may have a first wheel disposed thereon with targets and one or more gaps disposed about the first wheel. A second shaft may have a second wheel disposed thereon with targets and one or more gaps disposed thereon. The second wheel is in a fixed relationship relative to the first wheel. The first detection system may use data simultaneously from the first sensor and the second sensor to eliminate targets to determine position. The second detection system uses data only from the first sensor.

20 Claims, 6 Drawing Sheets

(51) Int. Cl.
    *F02D 41/30*    (2006.01)
    *G01B 7/30*    (2006.01)
    *G01D 5/22*    (2006.01)

(56) References Cited

U.S. PATENT DOCUMENTS

| | | | | |
|---|---|---|---|---|
| 4,941,445 | A * | 7/1990 | Deutsch | F02P 11/06 |
| | | | | 123/406.47 |
| 4,953,531 | A * | 9/1990 | Abe | F02P 5/1558 |
| | | | | 123/406.62 |
| 5,823,164 | A * | 10/1998 | Seki | F02D 11/107 |
| | | | | 123/399 |
| 9,765,711 | B2 | 9/2017 | Martinson | |
| 2006/0144363 | A1 * | 7/2006 | Beer | F02D 41/009 |
| | | | | 123/305 |
| 2010/0071644 | A1 * | 3/2010 | Noda | F02D 13/02 |
| | | | | 123/90.16 |
| 2016/0348597 | A1 * | 12/2016 | Martinson | G01D 5/26 |
| 2019/0360410 | A1 * | 11/2019 | Jones | G01D 5/2492 |
| 2020/0088551 | A1 * | 3/2020 | Wissel | G01D 5/24461 |
| 2022/0290965 | A1 * | 9/2022 | Ichinomiya | G01R 33/093 |

* cited by examiner

| Physical Cylinder # | Tooth marking start of cylinder | Crank degrees between teeth | | | |
|---|---|---|---|---|---|
| 1 | 30 | 90 | | | |
| 5 | 30 | 30 | 30 | 30 | |
| 3 | 120 | | | | |
| 6 | 120 | | | | |
| 2 | 60 | 60 | | | |
| 4 | 120 | | | | |

FIG. 4A

| Physical Cylinder # | Tooth marking start of cylinder | Target segment designations | | | |
|---|---|---|---|---|---|
| 1 | A | B | | | |
| 5 | C | D | E | F | |
| 3 | G | | | | |
| 6 | H | | | | |
| 2 | J | K | | | |
| 4 | L | | | | |

| Physical Cylinder # | Tooth marking start of cylinder | Crank degrees between teeth | | | |
|---|---|---|---|---|---|
| 1 | 30 | 90 | | 30 | 30 |
| 3 | 30 | 30 | 120 | | |
| 4 | 120 | | | 60 | |
| 2 | 60 | 120 | | | |

| Physical Cylinder # | Tooth marking start of cylinder | Target segment designations | | | |
|---|---|---|---|---|---|
| 1 | A | B | | C | D |
| 3 | E | F | G | | |
| 4 | H | | | J | |
| 2 | K | L | | | |

FIG. 4D

| Physical Cylinder # | Tooth marking start of cylinder | Crank degrees between teeth | | | | | |
|---|---|---|---|---|---|---|---|
| 1 | 30 | 90 | | 30 | 30 | 30 | 30 |
| 2 | 120 | | | 120 | | | |
| 3 | 60 | 60 | | 120 | | | |

| Physical Cylinder # | Tooth marking start of cylinder | Target segment designations | | | | | |
|---|---|---|---|---|---|---|---|
| 1 | A | B | | C | D | E | F |
| 2 | G | | | H | | | |
| 3 | J | | K | | L | | |

FIG. 5

METHOD FOR DETERMINING ROTATIONAL POSITION OF A ROTATING CAMSHAFT ON A RECIPROCATING ENGINE USING A TARGET WITH A PATTERN OF TEETH AND A COLLECTION OF DETECTION ALGORITHMS

This application claims priority to provisional application 63/028,853, which was filed on May 22, 2020, all of which is incorporated herein by reference.

BACKGROUND

Internal combustion engines include a crankshaft and a camshaft, and at least one of these shafts may include a wheel positioned for rotation therewith. A sensor may be positioned adjacent to the wheel for providing a signal to a controller. The controller may use the signal for determining an angular velocity and position of the wheel and its respective shaft. The controller may use this information to control, for example, the application of a spark and/or fuel into the engine's cylinders. The longer that it takes to get useful information related to the rotation of the wheel, the longer that it takes for the controller to use this information and then apply it. If this information is inaccurate due to noise in the signal or accelerations of the wheel, then that may cause operating delays or cause the controller to misidentify the wheel's position.

Because of wide variation in rotational speed that occurs during cranking the engine, detection of the camshaft position or crankshaft position may be difficult. There is a need in the art for a more reliable detection of the camshaft position or crankshaft position in a rapid manner so the engine may be started quicker.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation a system for identifying position of a first rotating shaft may comprise a first position detection system and a second position detection system. Each may be configured to identify a position of the first rotating shaft. The first detection system may comprise a first sensor associated with a first rotatable wheel disposed on the first shaft. The first rotatable wheel may comprise a plurality of targets and gaps about a circumference of the first rotatable wheel. A second sensor associated with a second rotatable wheel may be disposed on a second shaft. The second rotatable wheel may comprise a portion of consistent targets and one or more gaps about a circumference. The second wheel may be configured to rotate in a fixed relationship with the first wheel. The second position detection system may be configured to identify the position of the first shaft independent of the first position detection system using time comparisons between consecutive targets on the first wheel sensed by the first sensor.

A controller may be coupled to the first sensor and the second sensor. The controller may be configured to identify the position of the first shaft using the faster calculated shaft position from either the first position detection system or the second position detection system. The controller may be configured to obtain an angular position of the first shaft at a first time T1 with the first position detection system, which may comprise obtaining a signal from the second sensor. The second sensor signal may be associated with consistent targets and one or more gaps of the second wheel passing the second senor. The first position detection system may also comprise obtaining data from the second sensor signal to determine a position of the plurality of targets and gaps of the first rotatable wheel. The controller may be configured to simultaneously obtain a signal from the first sensor and the second sensor. The first sensor signal may be associated with the plurality of targets and gaps of the first rotatable wheel. Data may be obtained from the first sensor signal to determine the position of the plurality of targets and gaps of the first rotatable wheel. The angular position of the first shaft may be determined with the known position of the plurality of target and gaps of the first rotatable wheel at the first time T1 for the first position detection system.

The controller may be configured to obtain an angular position of the first shaft at a second time T2 with the second detection system. The second detection system may comprise obtaining a signal from the first sensor. The signal may be associated with the plurality of targets and gaps passing the first sensor. The position of the plurality of targets and gaps of the first rotatable wheel may be determined using a time stamp between targets. The angular position of the first shaft may be determined with the known position of the plurality of target and gaps of the first rotatable wheel at a second time T2 for the second position detection system.

The controller may be configured to use the position identified by the first position detection system if T1 is less than T2 and configured to use the positioned identified by the second position detection system if T2 is less than T1. Fuel may be injected based on the angular position of the first shaft at the lesser time of T1 or T2.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
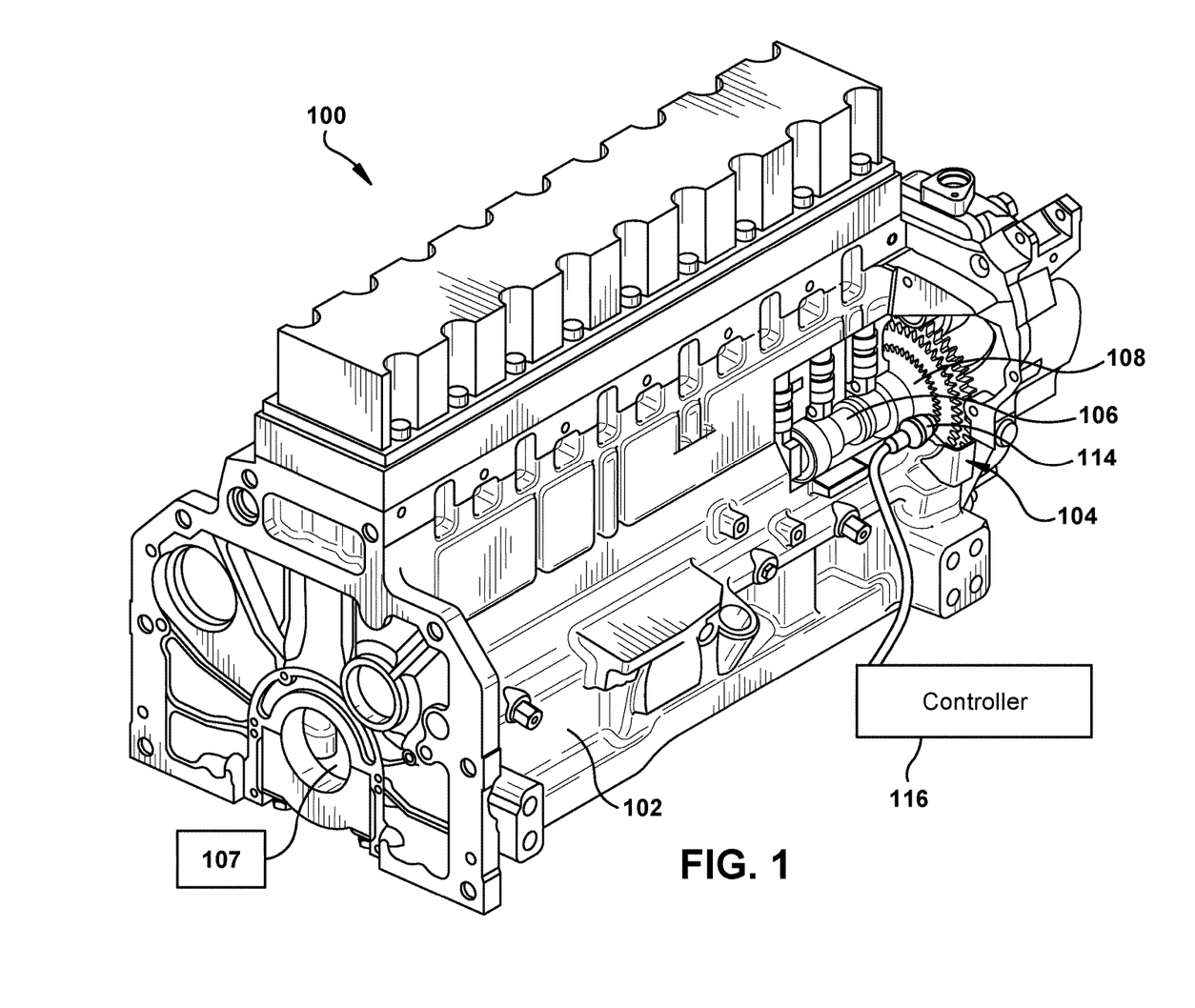
FIG. 1 is a perspective view of a power system having an example system for determining information related to a rotation of a shaft.

Referring to FIG. 1, there is shown a perspective view of a portion of a power system 100 for providing power to a variety of machines, including on-highway trucks, construction vehicles, marine vessels, stationary generators, automobiles, agricultural vehicles, and recreational vehicles. The engine 102 may be an internal combustion engine, such as a gasoline engine, a diesel engine, or any other exhaust gas producing engine. And further, the engine 102 may be of any size, have any number cylinders, and have any configuration.

Also, in FIG. 1, there is shown a system 104 for determining rotational position of a rotating shaft on a reciprocating engine using a wheel with a pattern of targets and a plurality of collection algorithms. Generally, the system 104 may use information simultaneously from a camshaft wheel and a crankshaft wheel as part of an elimination algorithm. The camshaft wheel and the crankshaft wheel may be oriented in a strategic and fixed relationship to each other. The camshaft wheel and the crankshaft wheel may rotate with a fixed relationship to each other. If information from the crankshaft is unavailable, such as a complete or partial failure of a crankshaft sensor, a cam-only algorithm may be utilized to determine the position of a camshaft. As such, position of the camshaft may be found rapidly with the elimination algorithms, but yet, the cam-only algorithm may be available in the event the elimination algorithms are unavailable.

The system 104 may utilize information related to a rotation of a first shaft 106, such as an angular position or velocity thereof. The shaft 106 is shown as a camshaft, but the system 104 could be used with a crankshaft or a transmission shaft or any other kind of rotating shaft. The system 104 may also comprise a second shaft 107 that may be disposed parallel to the first shaft 106. The second shaft 107 may be shown as a crankshaft, but the system could be used with any other rotating shaft.

A controller 116 may receive real time signal inputs from a first sensor 114 and a second sensor 115, and it may be in the form of an engine control unit or a transmission control unit or part of a controller area network, to name just a few examples. The controller 116 may use the angular position and velocity for many reasons, including for determining when to command fuel into cylinders (not shown) of the engine 102. The controller 116 may comprise memory, which may be volatile memory or nonvolatile memory. The memory may take the form of a bit-array, a rolling buffer, or other configuration.

The controller 116 may use the angular velocity and position information for determining when to output signals related to when to inject and ignite fuel in the respective cylinders, when to open and close intake valves, when to open and close output valves, such as an exhaust valve for example, and the like. Or more simply, the controller 116 may output signals related to when to inject and ignite fuel in the respective cylinders, when to open and close intake valves, when to open and close output valves, and the like based on the determination of which respective known target-and-gap sequence is identical to the sensed target-and-gap sequence.

A first wheel 108 may be rotatably disposed on the first shaft 106. The first sensor 114 is associated with the first wheel 108. The first wheel 108 may comprise a plurality of targets 110 and gaps 112 positioned therebetween, and they may be positioned about a circumference of the first wheel 108. The other circumferential spaces may be, for example, the result of a rise and fall between two consecutive targets 110 positioned right beside one another. The first wheel 108 may be made of steel or stainless steel or any other rigid material, and it may be mounted to the first shaft 106, using a press fit or a weld, for example. The targets may take any shape or form with sound engineering judgment, including without limitation, the targets 110 may be teeth, spaces, cavities, or slots. The shape of the targets may be for example, square, curvilinear, rectangular, triangular, or the like. A signal, provided by the first sensor 114, may vary in amplitude as the targets 110 and gaps 112 pass thereby. Various sensors could be used as the sensor 114, including variable reluctance sensors, Hall effect sensors, optical sensors, and proximity sensors. An axis defined by the first sensor 114 is shown being in parallel with an axis defined by the wheel 108, though in other arrangements, the axes could be perpendicular or of any other orientation. In one implementation, the first wheel 108 may be a cam wheel or cam target.

Figure 3:
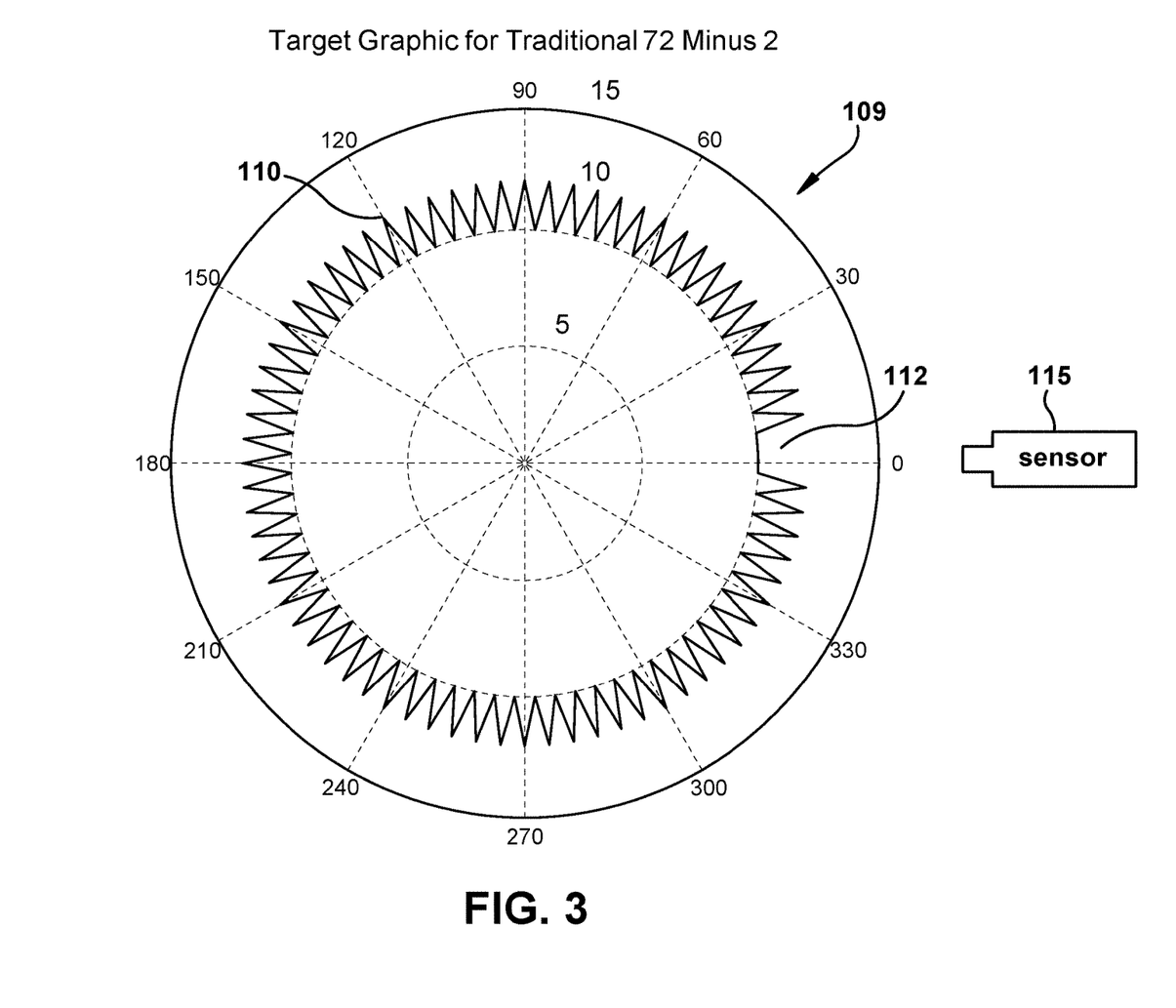
FIG. 3 is a schematic illustration of the example system for determining the information related to the rotation of the shaft; and, FIG. 4A is a schematic illustration of target position of a component of the inventive system.

A second wheel 109 may be rotatably disposed on the second shaft 107. The second sensor 115 is associated with the second wheel 109. The second wheel 109 may comprise a plurality of targets 110 and gaps 112 positioned therebetween, and they may be positioned about a circumference of the second wheel 109. In another implementation, the second wheel 109 may comprise consistent targets and one or more gaps, as shown in FIG. 3. The other circumferential spaces may be, for example, the result of a rise and fall between two consecutive targets 110 positioned right beside one another. By way of nonlimiting example, the second wheel 109 may comprise consistent targets without gaps. The second wheel 109 may be a 72 minus 2 wheel, indicating a two target size gap, for example. Other examples may be a 78 minus 2 for the second wheel or a 60 minus 2 wheel. In other implementations, the second wheel 109 may comprise a three target size gap, a four target size gap, or multiple gaps. The second wheel 109 may be made of steel or stainless steel or any other rigid material, and it may be mounted to the second shaft 107, using a press fit or a weld, for example. A signal, provided by the second sensor 115, may vary in amplitude as the targets 110 and gaps 112 pass thereby. Various sensors could be used as the second sensor 115, including variable reluctance sensors, Hall effect sensors, optical sensors, and proximity sensors. An axis defined by the second sensor 115 may be in parallel with an axis defined by the wheel 109, though in other arrangements, the axes could be perpendicular or of any other orientation. In one implementation, the second wheel 109 may be a crank wheel or crank target.

Figure 2:
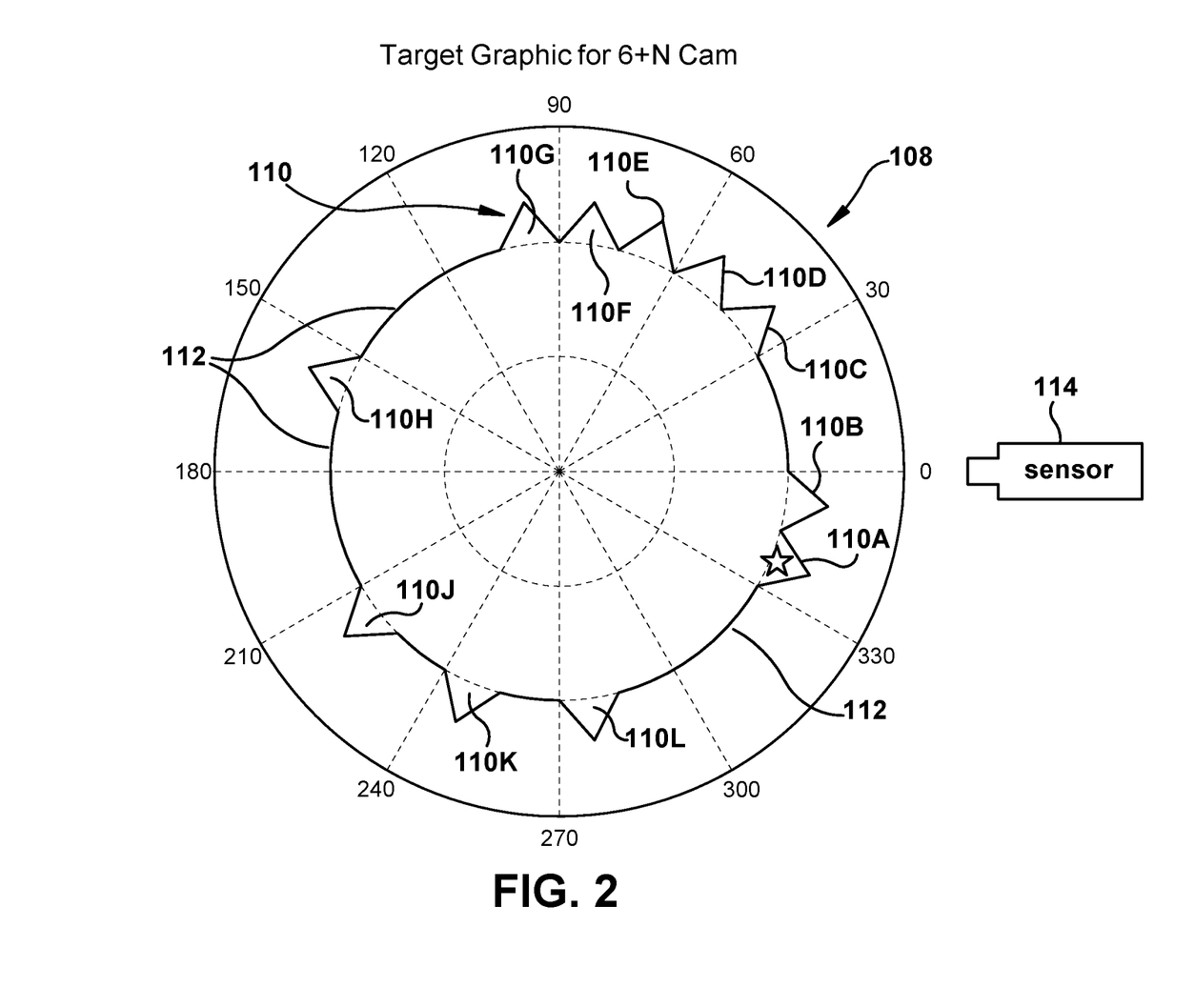
FIG. 2 is a schematic illustration of the example system for determining the information related to the rotation of the shaft.
Figure 4A:
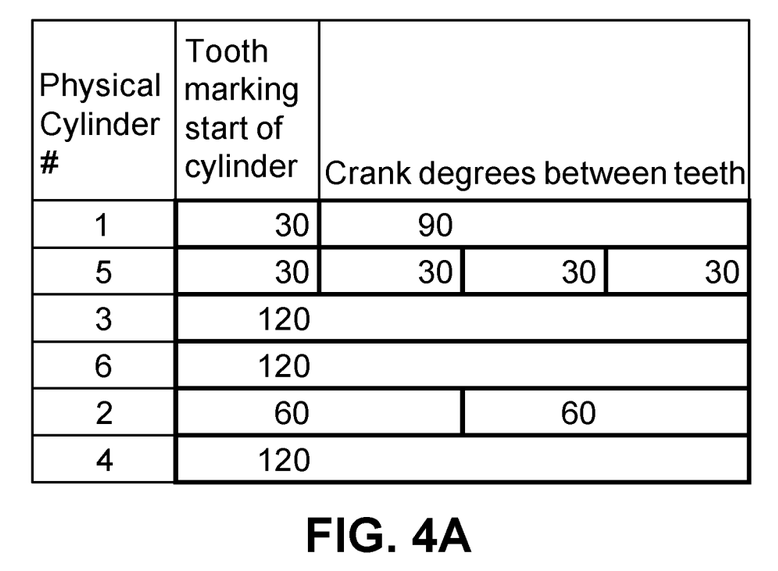
Figure 4B:
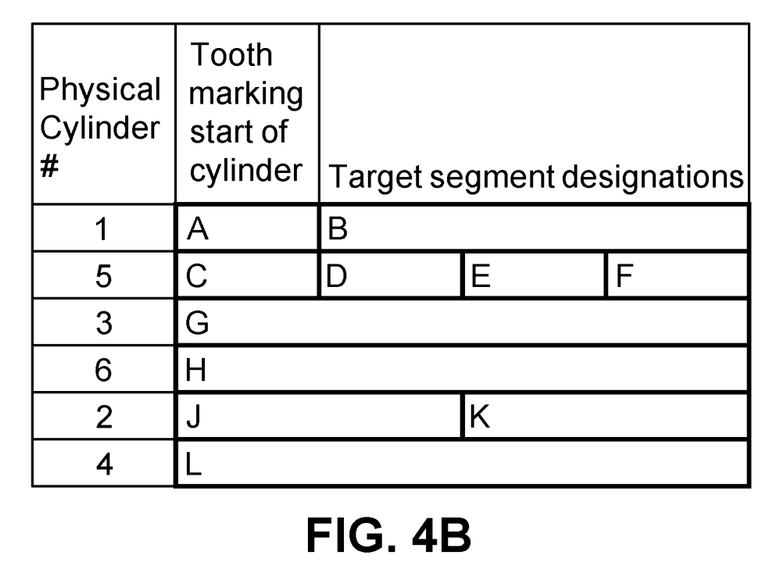
FIG. 4B is another schematic illustration of target position of a component of the inventive system.
Figure 4C:
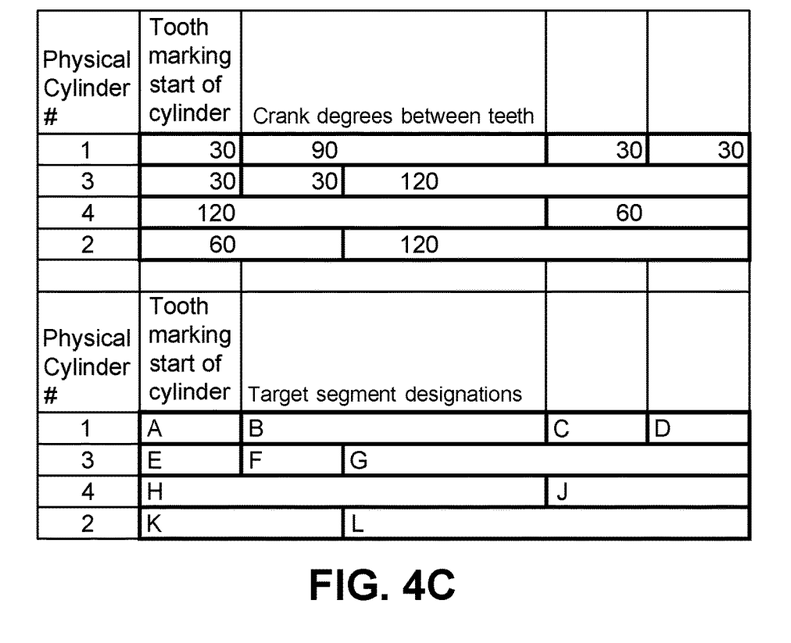
FIG. 4C is another schematic illustration of target position of a component of the inventive system.
Figure 4D:
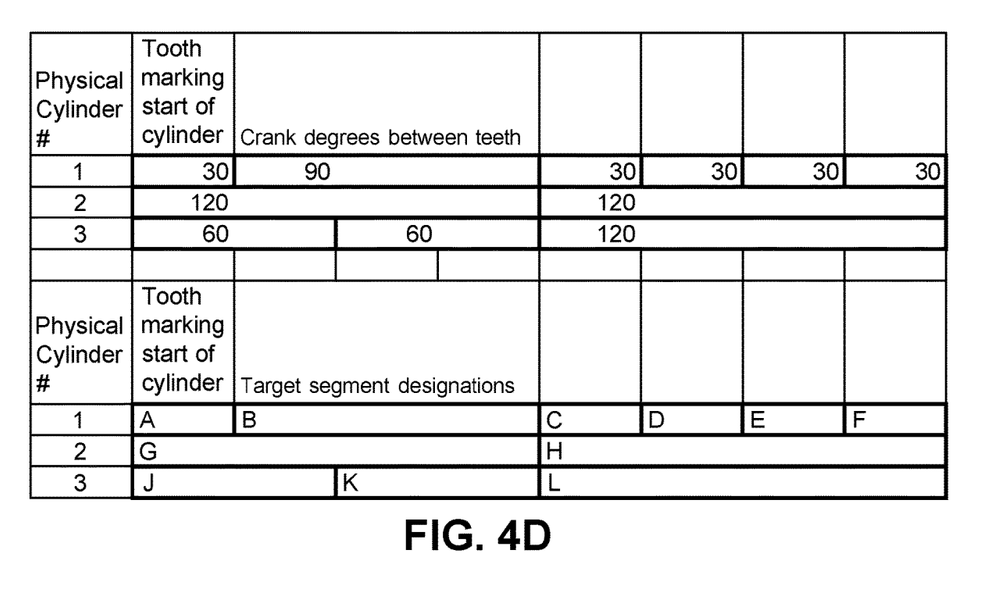
FIG. 4D is another schematic illustration of target position of a component of the inventive system.

In one nonlimiting implementation, the first wheel 108 may be the camshaft wheel. The targets 110 may be spaced at 30, 60, 90, or 120 crank angle degrees apart, which is the equivalent of 15, 30, 45, or 60 camshaft degrees apart. The second wheel 109 may be the crankshaft wheel. The crankshaft wheel may have known target (or tooth) spacing and one gap 112 per revolution as shown in FIG. 3. The gap 112 on the crankshaft target may be equivalent to two missing targets 110 and may be at a known rotational position. With reference to FIGS. 4A and 4B illustrating the camshaft wheel, an example implementation is shown of a 6-cylinder engine having 120 crank degrees per cylinder. Note that FIG. 4C shows a 4-cylinder engine having 180 crank degrees per cylinder for the camshaft wheel. FIG. 4D shows a 3-cylinder engine having 240 crank degrees per cylinder for the camshaft wheel. FIG. 4A illustrates the target marking start of the cylinder and the crank degrees between targets. As shown, each cylinder is represented by about 120 crankshaft degrees about the first wheel. The first cylinder may start with the target 110A. As shown in FIGS. 2, 4A, and 4B, targets 110A, 110B, 110C, 110D, 110E, 110F, 110G, 110H, 110J, 110K, and 110L are shown as one example of crank degrees between the targets 110.

The system 104 may comprise a first position detection system 200, a second position detection system 250, and the controller 116. The first position detection system 200 may comprise the first sensor 114 associated with the first wheel 108 on the first shaft 106 as previously described. The first position detection system 200 may also comprise the second sensor 115 associated with the second wheel 109 disposed on the second shaft 107. The second wheel 109 may be configured to rotate in a fixed relationship with the first wheel 108. The second position detection system 250 may comprise the first sensor 114 associated with the first rotatable wheel disposed on the first shaft 106. The second position detection system 250 may be configured to identify the position of the first shaft 106 independently of the first position detection system 200. This may occur if the second sensor 115 associated with the second wheel 109 becomes invalid through damage, malfunction, or is otherwise unavailable. Conversely, this may also occur if the second wheel 109 becomes damaged or is otherwise unavailable. The controller 116 receives signals from the first sensor 114 and the second sensor 115 and then identifies the position of the first shaft 106. In another implementation, the second position detection system 250 could determine the position of the first shaft 106 faster than the first position detection system 200.

The controller 116 may be configured to obtain an angular position of the first shaft 106 at a first time T1 with the first position detection system 200. The controller 116 may obtain a signal from the second sensor 115. The second sensor 115 may be associated with the consistent targets 110 and one or more gaps 112 of the second wheel 109 passing the second sensor 116. Data is obtained from the second sensor signal to determine a position of the plurality of targets 110 and gaps of the first rotatable wheel 108. The controller 116 may simultaneously obtain a signal from the first sensor 114. The first sensor signal may be associated with the plurality of targets 110 and gaps 112 of the first rotatable wheel 108. The controller may then obtain data from the first sensor signal to determine the position of the plurality of targets 110 and gaps 112 of the first rotatable wheel 108. The controller may then determine the angular position of the first shaft 106 with the known position of the plurality of targets 110 and gaps 112 of the first rotatable wheel 108 at the first time T1 for the first position detection system 200.

The elimination algorithm may be utilized when the first sensor 114 and the second sensor 115 are valid. When both the first sensor 114 and the second sensor 115 are valid, position of the first shaft 106 may be determined quickly. Ultimately, when only one possibility remains for the target 110 being analyzed on the first wheel 108 (in one example the camshaft tooth), the position of the specific target 110 is known and possibly the position of the first shaft 106. By having the first wheel 108 in a fixed relationship relative to the second wheel 109, counting of targets by the sensors 114, 115 provides the ability to eliminate targets and ultimately identify the position of the first shaft 106.

Continuing with the elimination algorithm for the first position detection system 200, and as previously described the first sensor 114 and the second sensor 115 simultaneously send signals of passing targets 110 to the controller 116. With respect to the targets 110 on the second wheel 109 (in one example, the crankshaft wheel), the second sensor 115 senses the number of second wheel targets 110 (for example, crankshaft teeth), that have passed since the last first wheel target 110 (for example, camshaft tooth). If applicable, any gap 112 in the second wheel 109 is noted if this is the target 110 following the gap. As shown in FIG. 3, the gap 112 may be equal to two missing targets 110, so if the second sensor 115 senses the gap, the next target 110 may indicate completion of a single revolution of the second wheel 109. As previously described, the controller 116 may have memory in the form of an array. The array may have bits that are equal to the number of targets 110 on the first wheel 108. Continuing with the second sensor 115 sensing targets 110 of the second wheel 109, if the count of targets and/or the presence or absence of the gap 112 eliminates any possibilities for the next possible target 110 on the first wheel 110, the array is updated to indicate this value.

Next, attention is turned to the first wheel 108 and the first sensor 114. The first sensor 114 senses targets 110 of the first wheel 108. If the count of targets 110 and/or the presence or absence of the gap 112 eliminates any possibilities for the next possible target 110 on the first wheel 110, the array is updated to indicate this value. The count of targets 110 on the second wheel 109 may be reset since the last target 110 on the first wheel 108. An indicator may be reset of whether the gap 112 of the second wheel 109 has passed since the last target 110 of the first wheel 108. After repeating this process and eliminating possibilities, only one possibility will remain for the next target of the first wheel 108 to identify the position.

By way of further example and reference to FIG. 2, the controller 116 may use an 11-bit-array for memory. The number of bits in the array may represent the number of targets 110 on the first wheel 108. The 11-bit-array may be used to represent the next possible cam target, for example. Initially, all the bits are set to a value of "1." In one example, all 11 bits are set to a value of "1." If one of the bits is set to "1," it means that target could potentially be the next target. If the bit is set to "0," it means enough information has been received from the first sensor 114 and the second sensor 115 to know that target 110 cannot possibly be the next target. As the sensors 114, 115 provide additional information about targets on the first wheel 108, the targets on the first wheel 108 are identified resulting in identification of the position of the rotating shaft 106.

When the first position detection system 200 is utilized, identification of position of the first shaft 106 and the second shaft 107 is very robust against variation in rotational speed that may occur during cranking the engine. By way of example, the first position detection system utilizes a pattern of target spacing that may facilitate calculation of average rotational speed over an engine cylinder event. By way of further example, utilizing the first position detection system, engine position (i.e. shaft position) may be determined at the first time T1, which may be less than one rotation of the first shaft 106. In another example, T1 may be 120 degrees rotation or less of the first shaft 106 (or 240 degrees of the second shaft 107). T1 may be about 37.5 to about 100 degrees rotation of the first shaft 106 (or about 65 to about 200 degrees of rotation of the second shaft 107.

The second position detection system 250 may comprise a cam-only algorithm as it may determine position of the first shaft 106 using information from the first sensor 114. The second position detection system may comprise the first sensor 114 and the first wheel 108. As previously stated, the first wheel 108 may be a camshaft wheel. The second position detection system 250 may find the position of the first shaft 106 at the time T2. The first wheel 108 may have equally spaced targets 110. By way of example, and with reference to FIG. 2, the equally spaced targets may be 110A, 110C, 100G, 110H, 110J, and 110L. Targets 110A, 110B, 110C, 110D, 110E, 110F, 110G, 110H, 110J, 110K, and 110L are consecutive targets with respect to each other. In other words, 110A, 110B, and 110C may be considered consecutive targets. Alternatively, the sequence of 110C, 110D, and 110E may be consecutive targets. The time between equally spaced targets should be relatively consistent. The time comparisons may be taken between consecutive targets 110. The time comparison between any two consecutive targets 110 may be stored in memory of the controller 116, such as a rolling buffer. By way of example, the first wheel 108 illustrated in FIG. 2 may have five targets where comparison calculations exist that can uniquely identify that specific target 110. When the controller 116 is utilizing the cam-only algorithm, it obtains a signal from the first sensor 114. The signal is associated with the plurality of target and gaps passing the first sensor 114. The controller may be configured to determine the position of the plurality of targets 110 and gaps 112 of the first wheel 108 using a time comparison between targets. The controller 116 may determine the angular position of the first shaft with the known or identified position of the plurality of targets and gaps. This may occur at the second time T2.

FIG. 2 and FIG. 4B, illustrate an example of utilizing the second position detection system 250. Time may be captured between two consecutive targets and stored in memory, such as a rolling buffer or an array. At each target 110, the controller 116 may perform a set of comparisons between the time comparison between two consecutive targets 110 and two known equally spaced targets 110. At each consecutive target 110, the controller performs a set of comparisons between two consecutive targets and two equally spaced targets that may uniquely identify the target if it is one of five specific targets. For example, assume the time comparison is a change of time N, which means the most recent change in time. Change in time N−1 means the second most recent time comparison, and N−2 is the third most recent time comparison, and so on. If the controller receives a signal from the first sensor 114 that the time comparison N is equal to the $2^{nd}$ most recent time comparison (N−1) and is equal to the summation of the previous four time comparisons, i.e. N=N−1=Sum(N−2, N−3, N−4, N−5), then the most recent target is at the end of segment H, and the position for target 110J is known. In other words, for example, if the change in time N compares to cylinder 3 (N−1) and cylinder 5 (Sum(N−2, N−3, N−4, N−5)), then the position may be at the end of cylinder 6. If a time comparison check does not pass, the next target 110 is evaluated. If none of the comparison checks pass, wait until the next target and repeat the time comparison checks again. In some implementations, comparison checks will pass after calculations for two or three cylinders.

The time to determine the position of the first shaft 106 using the second position detection system 250 takes time T2. In one implementation, T2 may be greater than or equal to one revolution of the first wheel 108. In another implementation, T2 may be less than one revolution of the first wheel 108. The second position detection system 250 may always be calculated in the background of the controller 116. In one implementation, it may be a backup to ensure starting of the engine. In another implementation, the controller 116 will send a signal to inject fuel based upon which detection system identifies the position of the first shaft 106 the quickest. The controller 116 may use the position identified by the first position detection system 200 if T1 is less than T2. The controller 116 may use the position identified by the second position detection system 250 if T2 is less than T1.

Figure 5:
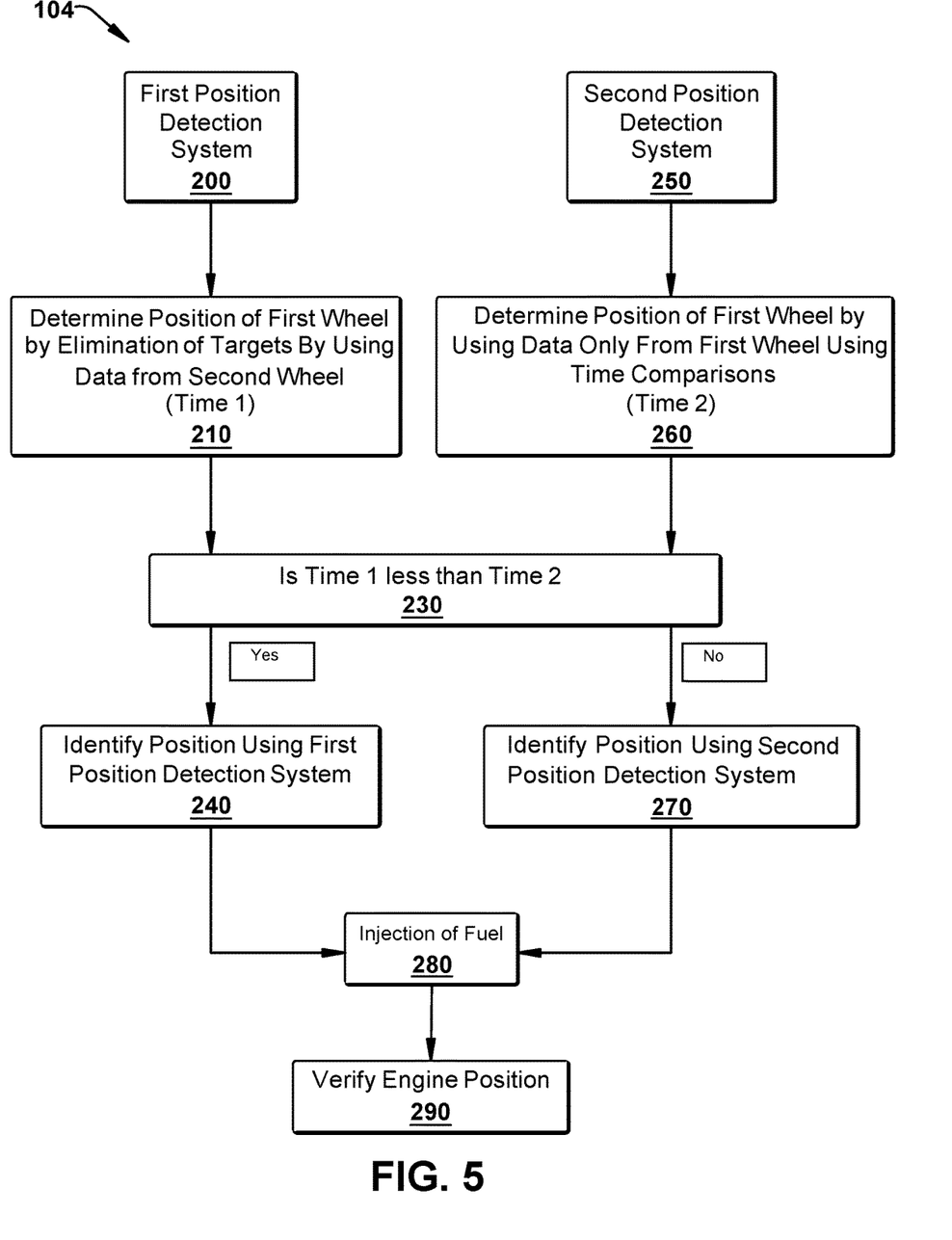
FIG. 5 is a flow chart of an example method for determining the information related to the rotation of the shaft.

After the position of the first shaft 106 is identified, a verification method 290 illustrated in FIG. 5 may be utilized to confirm the position of the first shaft 106 has been determined correctly. Each engine cylinder event should have approximately the same duration within a tolerance. Each time a target representing the end of a cylinder passes the first sensor 114, the controller 116 may confirm the duration of the cylinder is equal to about the duration of the previous cylinder. If the confirmation check fails, then the position was not determined correctly. If the confirmation check passes, then the position may be correct. After passing the confirmation check for a calibrated number of revolutions by counting revolutions at a specific target, the position of the first shaft 106 is considered verified.

Referring to FIG. 5, there is shown a schematic illustration of the system 104. The first position detection system 200 and the second position detection system 250 are provided as previously described. The first position detection system determines position of the first wheel by elimination algorithms and eliminates targets by using data from the second wheel 210. Data from the first and second sensors may be used simultaneously. The second position detection system 250 is independent from the first position detection system 200, but it is being calculated at the same time. The second position detection system 250 determines position of the first wheel using data only from the first wheel using time comparisons 260. The identification value used is chosen by which position detection system is quickest. If the time for the first position detection system is faster than the second position detection system 230 then the position is identified using the data from the first position detection system. If the second detection position system is faster, meaning T2 is less than T1, the position is identified using the data from the second position detection system. Once the shaft position is identified, fuel is injected 280. The engine position is then verified 290.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for identifying position of a first rotating shaft, comprising:
    a first position detection system configured to identify a position of the first shaft, comprising:
        a first sensor associated with a first rotatable wheel disposed on the first shaft, the first rotatable wheel comprising a plurality of targets and gaps about a circumference of the first rotatable wheel;
        a second sensor associated with a second rotatable wheel disposed on a second shaft, the second rotatable wheel comprising a portion of consistent targets and one or more gaps about a circumference, the second wheel configured to rotate in a fixed relationship with the first wheel;
    a second position detection system configured to identify the position of the first shaft independent of the first position detection system, comprising:
        the first sensor associated with the first rotatable wheel disposed on the first shaft;
    a controller coupled to the first sensor and the second sensor, the controller configured to:
        obtain an angular position of the first shaft at a first time T1 with the first position detection system, comprising:
            obtain a signal from the second sensor, the second sensor signal being associated with the consistent targets and one or more gaps of the second wheel passing the second sensor, obtain data from the second sensor signal to determine a position of the plurality of targets and gaps of the first rotatable wheel,
            simultaneously obtain a signal from the first sensor, the first sensor signal being associated with the plurality of targets and gaps of the first rotatable wheel, obtain data from the first sensor signal to determine the position of the plurality of targets and gaps of the first rotatable wheel, and determine the angular position of the first shaft with the known position of the plurality of target and gaps of the first rotatable wheel at the first time T1 for the first position detection system;
        obtain an angular position of the first shaft at a second time T2 with the second position detection system, comprising:
            obtain a signal from the first sensor, the signal being associated with the plurality of targets and gaps passing the first sensor, determine the position of the plurality of targets and gaps of the first rotatable wheel using a time stamp between targets, and determine the angular position of the first shaft with the known position of the plurality of target and gaps of the first rotatable wheel at a second time T2 for the second position detection system;
        use the position identified by the first position detection system if T1 is less than T2 and use the positioned identified by the second position detection system if T2 is less than T1; and
        inject fuel based upon which detection system identifies the position of the first shaft the quickest.

2. The system of claim 1, wherein the first sensor is a cam shaft sensor, the first shaft is a camshaft, the second sensor is a crankshaft sensor, and the second shaft is a crankshaft.

3. The system of claim 1, wherein the angular position of the first shaft at T1 is one rotation or less of the first shaft.

4. The system of claim 3, wherein the angular position of the first shaft at T1 is about 120 degrees rotation or less of the first shaft.

5. The system of claim 3, wherein the angular position of the first shaft at T1 is about 37.5 to about 100 degrees rotation of the first shaft.

6. The system of claim 3, wherein the angular position of the first shaft at T2 is more than one rotation of the first shaft.

7. The system of claim 1, wherein the controller is configured to simultaneously utilize data from the first sensor and the second sensor to identify the position of the first shaft by the first position detection system by elimination of targets, each target designated as not being the next possible target until only one target remains to identify the position of the first shaft.

8. The system of claim 7, wherein the controller further comprises memory configured to correspond to the number of targets of the targets and gaps spaced about the circumference of the first wheel, the second sensor configured to sense the number of targets of the second wheel that passed the second sensor since the last target of the first wheel passed the first sensor, the controller configured to:
determine if the count of targets of the second wheel, presence of the gap, and/or absence of a gap eliminates the identification of a next possible target of the first wheel;
update the memory to indicate elimination of the next possible target of the first wheel;
reset a count of targets of the second wheel since the last target of the first wheel passed the first sensor; and
reset an indicator of whether one of the gaps of the second wheel has passed the second sensor since the last target on the first wheel passed the first sensor, wherein when only one possibility remains for the next first wheel target, the position of the first shaft is identified at T1.

9. The system of claim 1, wherein the second position detection system only uses data from the first sensor, the plurality of targets and gaps about the circumference of the first wheel comprising consecutive targets and equally spaced targets, the consecutive targets being greater in number than the equally spaced targets, wherein the controller is configured to:
determine a comparison time between two consecutive targets of the first wheel;
capture time between the two consecutive targets on the first wheel and save in memory;
compare the time between the two consecutive targets to a known time comparison value between two equally spaced targets;
determine if comparison between two consecutive targets and equally spaced targets identify position of target;
repeat steps of capturing time between consecutive teeth and comparing with known time between two equally spaced targets until comparisons are valid to identify position.

10. The system of claim 1, wherein the controller is configured to verify accuracy of the identified position of the shaft.

11. The system of claim 1, wherein the first sensor is a Hall effect sensor or a variable reluctance sensor.

12. A method for identifying position of a first rotating shaft, comprising:
identifying a position of the first shaft with a first position detection system comprising:
a first sensor associated with a first rotatable wheel disposed on the first shaft, the first rotatable wheel comprising a plurality of targets and gaps about a circumference of the first rotatable wheel;
a second sensor associated with a second rotatable wheel disposed on a second shaft, the second rotatable wheel comprising a portion of consistent targets and one or more gaps about a circumference, the second wheel configured to rotate in a fixed relationship with the first wheel;
identifying the position of the first shaft with a second position detection system independent of the first position detection system, comprising:
the first sensor associated with the first rotatable wheel disposed on the first shaft;
obtaining an angular position of the first shaft at a first time T1 with the first position detection system, comprising:
obtaining a signal from the second sensor, the second sensor signal being associated with the consistent targets and one or more gaps of the second wheel passing the second sensor, obtain data from the second sensor signal to determine a position of the plurality of targets and gaps of the first rotatable wheel,
simultaneously obtaining a signal from the first sensor, the first sensor signal being associated with the plurality of targets and gaps of the first rotatable wheel, obtain data from the first sensor signal to determine the position of the plurality of targets and gaps of the first rotatable wheel, and determine the angular position of the first shaft with the known position of the plurality of target and gaps of the first rotatable wheel at the first time T1 for the first position detection system;
obtaining an angular position of the first shaft at a second time T2 with the second position detection system, comprising:
obtaining a signal from the first sensor, the signal being associated with plurality of targets and gaps passing the first sensor, determine the position of the plurality of targets and gaps of the first rotatable wheel using a comparison time between targets, and determine the angular position of the first shaft with the known position of the plurality of targets and gaps of the first rotatable wheel at a second time T2 for the second position detection system;
using the position identified by the first position detection system if T1 is less than T2 and use the positioned identified by the second position detection system if T2 is less than T1; and
injecting fuel based upon which detection system identifies the position of the first shaft the quickest.

13. The method of claim 12, wherein the system of claim 1, wherein the first sensor is a camshaft sensor, the first shaft is a camshaft, the second sensor is a crankshaft sensor, and the second shaft is a crankshaft sensor.

14. The method of claim 12, wherein T1 is measured by 120 degrees rotation or less of the first shaft, wherein the first sensor is a camshaft sensor, the first shaft is a camshaft, the second sensor is a crankshaft sensor, and the second shaft is a crankshaft sensor.

15. The method of claim 12, wherein the first sensor is a Hall effect sensor or a variable reluctance sensor.

16. The method of claim 12, further comprising the step of simultaneously utilizing data from the first sensor and the second sensor to identify the position of the first shaft by the first position detection system by elimination of targets, each target designated as not being the next possible target until only one target remains to identify the position of the first shaft.

17. The method of claim 16, further comprising a bit-array comprising bits corresponding to the number of targets of the targets and gaps spaced about the circumference of the first wheel,
sensing the number of targets of the second wheel that passed the second sensor since the last target of the first wheel passed the first sensor,
determining if the count of targets of the second wheel, presence of the gap, and/or absence of a gap eliminates the identification of a next possible target of the first wheel;
updating the bit-array to indicate elimination of the next possible target of the first wheel;

resetting a count of targets of the second wheel since the last target of the first wheel passed the first sensor; and resetting an indicator of whether one of the gaps of the second wheel has passed the second sensor since the last target on the first wheel passed the first sensor, wherein when only one possibility remains for the next first wheel target, the position of the first shaft is identified at T1.

18. The method of claim 12, wherein the second position detection system only uses data from the first sensor, the plurality of targets and gaps about the circumference of the first wheel comprising consecutive targets and equally spaced targets, the consecutive targets being greater in number than the equally spaced targets, the method further comprising the steps of:

determining a comparison time between two consecutive targets of the first wheel;

capturing time between the two consecutive targets on the first wheel and saving in memory;

comparing the time between the two consecutive targets to a known time comparison value between two equally spaced targets;

determining if comparison between two consecutive targets and equally spaced targets identify position of target;

repeating steps of capturing time between consecutive teeth and comparing with known time between two equally spaced targets until comparisons are valid to identify position.

19. The method of claim 12, wherein the first shaft is a camshaft and the second shaft is a crankshaft for an engine.

20. A system for identifying position of a first rotating shaft, comprising:

a first elimination position detection system configured to identify a position of the first shaft, comprising:

a first sensor associated with a first rotatable wheel disposed on the first shaft, the first rotatable wheel comprising a plurality of targets and gaps about a circumference of the first rotatable wheel;

a second sensor associated with a second rotatable wheel disposed on a second shaft, the second rotatable wheel comprising a portion of consistent targets and one or more gaps about a circumference, the second wheel configured to rotate in a fixed relationship with the first wheel;

a second position detection system configured to identify the position of the first shaft independent of the first position detection system using time comparisons between consecutive targets on the first wheel sensed by the first sensor;

a controller coupled to the first sensor and the second sensor, the controller configured to identify the position of the first shaft using the faster calculated shaft position from either the first position detection system or the second position detection system.

* * * * *